(12) United States Patent
Gray et al.

(10) Patent No.: US 11,239,670 B2
(45) Date of Patent: Feb. 1, 2022

(54) CELL BALANCING BATTERY MODULE AND ELECTRICAL APPARATUS

(71) Applicants: Richard Landry Gray, Taipei (TW); Wei-Guang Qiu, Beijing (CN)

(72) Inventors: Richard Landry Gray, Taipei (TW); Wei-Guang Qiu, Beijing (CN)

(*) Notice: Subject to any disclaimer, the term of this patent is extended or adjusted under 35 U.S.C. 154(b) by 282 days.

(21) Appl. No.: 16/566,879

(22) Filed: Sep. 11, 2019

(65) Prior Publication Data
US 2020/0112179 A1  Apr. 9, 2020

Related U.S. Application Data

(60) Provisional application No. 62/731,905, filed on Sep. 16, 2018.

(51) Int. Cl.
| | | |
|---|---|---|
| *H02J 7/00* | (2006.01) |
| *B60L 58/22* | (2019.01) |
| *H01M 10/48* | (2006.01) |
| *H01M 10/42* | (2006.01) |
| *G06F 1/16* | (2006.01) |
| *H01M 10/44* | (2006.01) |

(52) U.S. Cl.
CPC ............ *H02J 7/0019* (2013.01); *B60L 58/22* (2019.02); *G06F 1/1635* (2013.01); *H01M 10/4264* (2013.01); *H01M 10/441* (2013.01); *H01M 10/482* (2013.01); *H02J 7/0016* (2013.01); *H01M 2010/4271* (2013.01)

(58) Field of Classification Search
CPC ...... H02J 7/0019; H02J 7/0016; H02J 7/0047; H01M 10/482; H01M 10/4264; H01M 10/441; G06F 1/1635; G06F 1/263; B60L 58/22

USPC ......................................................... 320/112
See application file for complete search history.

(56) References Cited

U.S. PATENT DOCUMENTS

| | | | | |
|---|---|---|---|---|
| 5,581,170 A * | 12/1996 | Mammano | ............. | H02J 7/0019 320/116 |
| 5,952,815 A * | 9/1999 | Rouillard | ............... | H02J 7/0021 320/116 |
| 6,150,795 A * | 11/2000 | Kutkut | .................. | H02J 7/0018 320/118 |
| 7,081,737 B2 * | 7/2006 | Liu | ...................... | H01M 10/441 320/130 |
| 7,352,155 B2 * | 4/2008 | Li | ......................... | G01R 31/396 320/118 |
| 7,400,114 B2 * | 7/2008 | Anzawa | .................. | B60L 50/60 320/119 |

(Continued)

*Primary Examiner* — John T Trischler

(57) ABSTRACT

A cell balancing battery module comprising: a cell string having N ports in series; a maximum and minimum finding circuit coupled with the N ports and the at least one switched capacitor comparison circuit for performing a voltage comparison procedure to find a highest voltage port number and a lowest voltage port number, the voltage comparison procedure including a plurality of voltage comparison operations using two phases of at least one switched capacitor comparison circuit; a charge and discharge connecting circuit coupled with the N ports and an inductor, and being configured to select a highest voltage port out of the N ports according to the highest voltage port number to deliver energy to the inductor, and select a lowest voltage port out of the N ports according to the lowest voltage port number to receive energy released from the inductor.

13 Claims, 17 Drawing Sheets

(56) References Cited

U.S. PATENT DOCUMENTS

| | | | |
|---|---|---|---|
| 7,696,725 B2* | 4/2010 | Liu | H02J 7/0018 320/136 |
| 7,999,553 B2* | 8/2011 | Yamabe | B60L 50/51 324/433 |
| 8,004,246 B2* | 8/2011 | Liu | H02J 7/0018 320/136 |
| 8,163,411 B2* | 4/2012 | Mizoguchi | H02J 7/0016 429/61 |
| 8,237,411 B2* | 8/2012 | Liu | H02J 7/0018 320/136 |
| 8,269,469 B2* | 9/2012 | Cegnar | H01G 9/155 320/167 |
| 8,339,100 B2* | 12/2012 | Li | H01M 10/4207 320/118 |
| 8,350,528 B2* | 1/2013 | Yang | H02J 7/0016 320/118 |
| 8,536,824 B2* | 9/2013 | St-Jacques | H02J 7/0016 320/103 |
| 8,692,508 B2* | 4/2014 | Shimizu | H02J 7/0016 320/103 |
| 8,836,168 B2* | 9/2014 | Yamanoue | H02J 7/0016 307/81 |
| 8,836,290 B2* | 9/2014 | Liu | H01M 10/441 320/157 |
| 8,922,169 B2* | 12/2014 | Sugimura | G01R 31/396 320/134 |
| 9,085,243 B2* | 7/2015 | Chatroux | B60L 58/22 |
| 9,148,028 B2* | 9/2015 | Suzuki | H02J 7/0014 |
| 9,203,121 B2* | 12/2015 | Liu | H02J 7/007 |
| 10,148,098 B2* | 12/2018 | Liu | H02J 7/007 |
| 10,211,648 B2* | 2/2019 | Hasenkopf | H02J 7/0016 |
| 10,505,376 B2* | 12/2019 | Sugeno | H02J 7/0021 |
| 10,734,818 B2* | 8/2020 | Uno | H01M 10/441 |
| 2005/0140336 A1* | 6/2005 | Anzawa | H02J 7/0016 320/118 |
| 2006/0119319 A1* | 6/2006 | Sakurai | H02J 7/0016 320/116 |
| 2007/0285054 A1* | 12/2007 | Li | B60L 58/22 320/116 |
| 2008/0202830 A1* | 8/2008 | Yamabe | B60L 50/51 180/65.31 |
| 2009/0130542 A1* | 5/2009 | Mizoguchi | H01M 10/482 429/61 |
| 2009/0278489 A1* | 11/2009 | St-Jacques | H02J 7/0016 320/103 |
| 2010/0019724 A1* | 1/2010 | Mizutani | H01M 10/425 320/118 |
| 2010/0039072 A1* | 2/2010 | Cegnar | H01G 9/155 320/167 |
| 2010/0123433 A1* | 5/2010 | Guo | H01M 10/482 320/118 |
| 2011/0109268 A1* | 5/2011 | Lee | H02J 7/0019 320/116 |
| 2011/0248677 A1* | 10/2011 | Shimizu | H02J 7/0016 320/118 |
| 2012/0013194 A1* | 1/2012 | Yamanoue | H02J 7/0016 307/81 |
| 2012/0176160 A1* | 7/2012 | Sugimura | H02J 7/0016 327/50 |
| 2013/0002203 A1* | 1/2013 | Kuraishi | H02J 7/0018 320/134 |
| 2013/0020982 A1* | 1/2013 | Mercier | B60L 58/15 320/103 |
| 2013/0038290 A1* | 2/2013 | Chatroux | H02J 7/0018 320/119 |
| 2013/0093248 A1* | 4/2013 | Liu | H02J 7/007 307/77 |
| 2013/0113432 A1* | 5/2013 | Suzuki | H02J 7/0014 320/134 |
| 2014/0009092 A1* | 1/2014 | Ma | B60L 58/22 318/139 |
| 2014/0239878 A1* | 8/2014 | Yun | H02J 7/0019 320/103 |
| 2014/0354212 A1* | 12/2014 | Sugeno | B60L 58/12 320/103 |
| 2016/0141895 A1* | 5/2016 | Liu | H02J 7/007 320/103 |
| 2016/0190828 A1* | 6/2016 | Nakamura | H02J 7/0019 320/118 |
| 2016/0368392 A1* | 12/2016 | Braun | B60L 53/20 |
| 2017/0271889 A1* | 9/2017 | Sugeno | H01M 10/42 |
| 2017/0338672 A1* | 11/2017 | Hasenkopf | H02J 7/0016 |
| 2018/0205238 A1* | 7/2018 | Uno | H02M 7/483 |
| 2020/0185931 A1* | 6/2020 | Stuart | H02J 7/345 |

* cited by examiner

CELL BALANCING BATTERY MODULE AND ELECTRICAL APPARATUS

PRIORITY CLAIM

This application claims priority to U.S. provisional application Ser. No. 62/731,905 filed on Sep. 16, 2018; the contents of which are incorporated by reference.

BACKGROUND OF THE INVENTION

Field of the Invention

The present invention relates to a battery module, especially to a battery module capable of adaptively balancing the energy among a string of cells therein.

Description of the Related Art

All battery charging systems, where the batteries are charged in series, can suffer from a charging imbalance problem. Please refer to FIG. 1a, which is an illustrative diagram of a string of batteries undergoing a charging process of prior art. As the batteries charge the voltage across the "strong" cells can increase more slowly, while the voltage across the "weak" cells will increase more quickly. For example, as illustrated in the FIG. 1a, at some point in time, the voltage across a weak cell 11 has reached 3.8V, while the voltage across a strong cell 12 increases to just 3.4V. When the weak cell 11 reaches its end of charge level then the charger necessarily shuts down current to the whole series string which will leave the strong cell 12 only partially charged. Not only does this limit the amount of energy that the string of batteries can store, it also limits the lifetime of the string since the weak batteries tend to get overcharged while the strong batteries are undercharged. This disparity increases over time up to the point where the total energy storage capacity of the battery string decreases past some threshold and the battery string must be replaced, a very costly proposition for something like an electric car or home battery system, or even more so for an industrial battery storage system.

The same problem happens during discharge as illustrated in FIG. 1b. At some point in time, the voltage across the weak cell 11 has dropped to 2.9V, while the voltage across the strong cell 12 just drops to 3.1V. In this situation the weak cell 11 reaches its minimum voltage before the strong cell 12, and the discharge must stop before all the energy in the string is utilized.

To solve these problems people use a charge balancing network 20 as illustrated in FIG. 2. The balancing network 20 can take charge from either cell and inject it into the other cell. Ideally it should be able to do this for battery strings of arbitrary length (more than two) and it should be able to do this with as little loss of energy as possible.

However, the charge balancing network 20 generally requires a processor and therefore increases the total cost of a battery module substantially. Besides, the processor can fail when heat thereon is not dissipated quickly enough or it encounters a power surge or unstable voltage.

To solve the foregoing problems, a novel scheme for charging and discharging a string of batteries is needed.

SUMMARY OF THE INVENTION

One objective of the present invention is to disclose a cell balancing battery module, which uses a battery charge balancing scheme that is simple, robust, efficient and inexpensive.

Another objective of the present invention is to disclose a cell balancing battery module, which can maximize the energy that a battery string is capable of providing and also increase the lifetime of the battery string.

Another objective of the present invention is to disclose an electrical apparatus, of which a cell balancing battery module uses a battery charge balancing scheme that is simple, robust, efficient and inexpensive.

Still another objective of the present invention is to disclose an electrical apparatus, of which a cell balancing battery module can maximize the energy that a battery string is capable of providing and also increase the lifetime of the battery string.

To attain the foregoing objectives, a cell balancing battery module is proposed, including:

a cell string having N cells in series to provide N+1 terminals, N>1, each of the N cells having a port consisting of a positive end and a negative end connected with two adjacent terminals of the N+1 terminals respectively;

a comparison unit coupled with the N+1 terminals for performing a voltage comparison procedure to find a highest voltage port number and a lowest voltage port number out of N said ports, the voltage comparison procedure including a plurality of voltage comparison operations using at least one comparison circuit; and a switching logic and driver coupled with the cell string and an inductor, and being configured to select a highest voltage port out of N said ports according to the highest voltage port number to deliver energy to the inductor, and select a lowest voltage port out of N said ports according to the lowest voltage port number to receive energy released from the inductor.

In one embodiment, the voltage comparison procedure includes a decision tree algorithm.

In one embodiment, the voltage comparison procedure further includes:

finding a highest odd cell and transferring an amount of energy from the highest odd cell into a lowest even cell;

finding a highest even cell and transferring an amount of energy from the highest even cell into a lowest odd cell; and repeating the two steps above until all cell voltages are equal.

In one embodiment, the comparison circuit is a switched capacitor comparison circuit including a first capacitor, a second capacitor, an inverter and a switch, when in phase I, the first capacitor has a first end connected to the positive terminal of a first cell voltage, and a second end connected to an input end of the inverter, the second capacitor has a third end connected to the negative terminal of a second cell voltage, and a fourth end connected to the input end of the inverter, and the switch is switched on to short the input end and an output end of the inverter; and when in phase II, the first capacitor has the first end connected to the negative terminal of the first cell voltage, and the second end connected with the input end of the inverter, the second capacitor has the third end connected to the positive terminal of the second cell voltage, and the fourth end connected with the input end of the inverter, and the switch is switched off to enable the inverter to provide an output voltage via the output end, where the output voltage will be at a high level if the first cell voltage is higher than the second cell voltage, and will be at a low level if the first cell voltage is lower than the second cell voltage.

In one embodiment, the comparison circuit is a switched capacitor comparison circuit including a first capacitor, a second capacitor, an inverter and a switch, when in phase I, the first capacitor has a first end connected to the negative terminal of a first cell voltage, and a second end connected to an input end of the inverter, the second capacitor has a third end connected to the positive terminal of a second cell voltage, and a fourth end connected to the input end of the inverter, and the switch is switched on to short the input end and an output end of the inverter; and when in phase II, the first capacitor has the first end connected to the positive terminal of the first cell voltage, and the second end connected with the input end of the inverter, the second capacitor has the third end connected to the negative terminal of the second cell voltage, and the fourth end connected with the input end of the inverter, and the switch is switched off to enable the inverter to provide an output voltage via the output end, where the output voltage will be at a low level if the first cell voltage is higher than the second cell voltage, and will be at a high level if the first cell voltage is lower than the second cell voltage.

In one embodiment, the cell balancing battery module further includes a detection circuit for detecting if cells of the cell string are all within a preset voltage of each other, and the detection circuit will output a high level when the cells are all within the preset voltage of each other.

In one embodiment, the voltage comparison operations have included a hysteresis voltage.

To attain the foregoing objectives, the present invention further proposes an electrical apparatus including a cell balancing battery module and an electrical device powered by the cell balancing battery module, the cell balancing battery module comprising:

a cell string having N cells in series to provide N+1 terminals, N>1, each of the N cells having a port consisting of a positive end and a negative end connected with two adjacent terminals of the N+1 terminals respectively;

a comparison unit coupled with the N+1 terminals for performing a voltage comparison procedure to find a highest voltage port number and a lowest voltage port number out of N said ports, the voltage comparison procedure including a plurality of voltage comparison operations using at least one comparison circuit; and a switching logic and driver unit coupled with the cell string and an inductor, and being configured to select a highest voltage port out of N said ports according to the highest voltage port number to deliver energy to the inductor, and select a lowest voltage port out of N said ports according to the lowest voltage port number to receive energy released from the inductor.

In one embodiment, the voltage comparison procedure includes a decision tree algorithm.

In one embodiment, the voltage comparison procedure further includes:

finding a highest odd cell and transferring an amount of energy from the highest odd cell into a lowest even cell;

finding a highest even cell and transferring an amount of energy from the highest even cell into a lowest odd cell; and repeating the two steps above until all cell voltages are equal.

In one embodiment, the comparison circuit is a switched capacitor comparison circuit including a first capacitor, a second capacitor, an inverter and a switch, when in phase I, the first capacitor has a first end connected to the positive terminal of a first cell voltage, and a second end connected to an input end of the inverter, the second capacitor has a third end connected to the negative terminal of a second cell voltage, and a fourth end connected to the input end of the inverter, and the switch is switched on to short the input end and an output end of the inverter; and when in phase II, the first capacitor has the first end connected to the negative terminal of the first cell voltage, and the second end connected with the input end of the inverter, the second capacitor has the third end connected to the positive terminal of the second cell voltage, and the fourth end connected with the input end of the inverter, and the switch is switched off to enable the inverter to provide an output voltage via the output end, where the output voltage will be at a high level if the first cell voltage is higher than the second cell voltage, and will be at a low level if the first cell voltage is lower than the second cell voltage.

In one embodiment, the comparison circuit is a switched capacitor comparison circuit including a first capacitor, a second capacitor, an inverter and a switch, when in phase I, the first capacitor has a first end connected to the negative terminal of a first cell voltage, and a second end connected to an input end of the inverter, the second capacitor has a third end connected to the positive terminal of a second cell voltage, and a fourth end connected to the input end of the inverter, and the switch is switched on to short the input end and an output end of the inverter; and when in phase II, the first capacitor has the first end connected to the positive terminal of the first cell voltage, and the second end connected with the input end of the inverter, the second capacitor has the third end connected to the negative terminal of the second cell voltage, and the fourth end connected with the input end of the inverter, and the switch is switched off to enable the inverter to provide an output voltage via the output end, where the output voltage will be at a low level if the first cell voltage is higher than the second cell voltage, and will be at a high level if the first cell voltage is lower than the second cell voltage.

In one embodiment, the cell balancing battery module further includes a detection circuit for detecting if cells of the cell string are all within a preset voltage of each other, and the detection circuit will output a high level when the cells are all within the preset voltage of each other.

In one embodiment, the voltage comparison operations have included a hysteresis voltage.

For possible embodiments, the electrical apparatus can be an electrical vehicle or a portable computer.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1A:
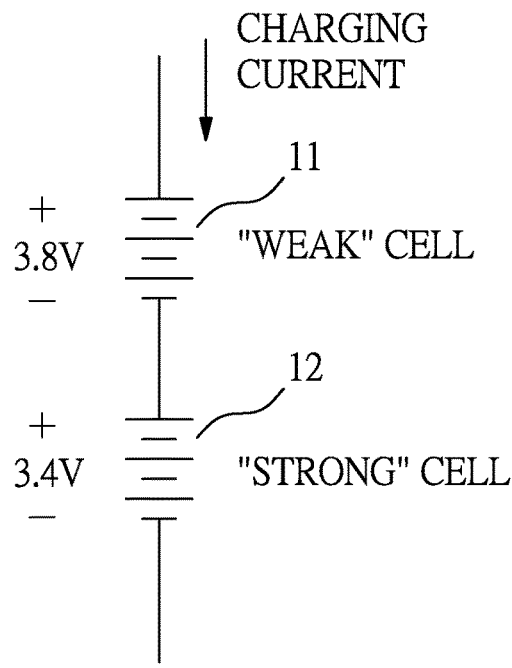
FIG. 1a is an illustrative diagram of a string of batteries undergoing a charging process of prior art.
Figure 1B:
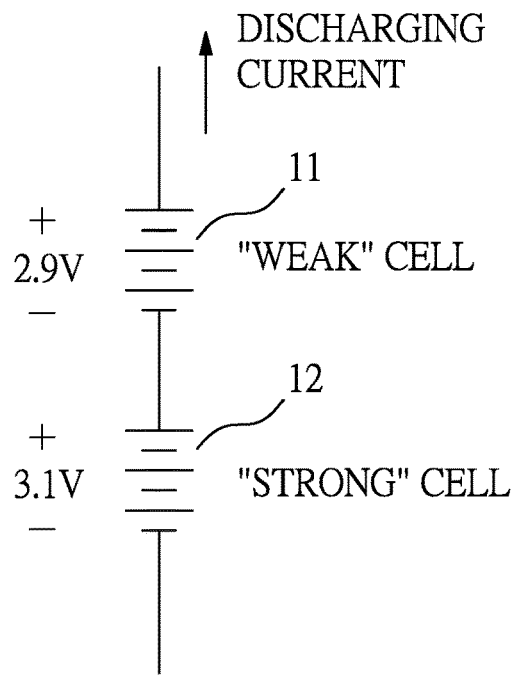
FIG. 1b is an illustrative diagram of a string of batteries undergoing a discharging process of prior art.
Figure 2:
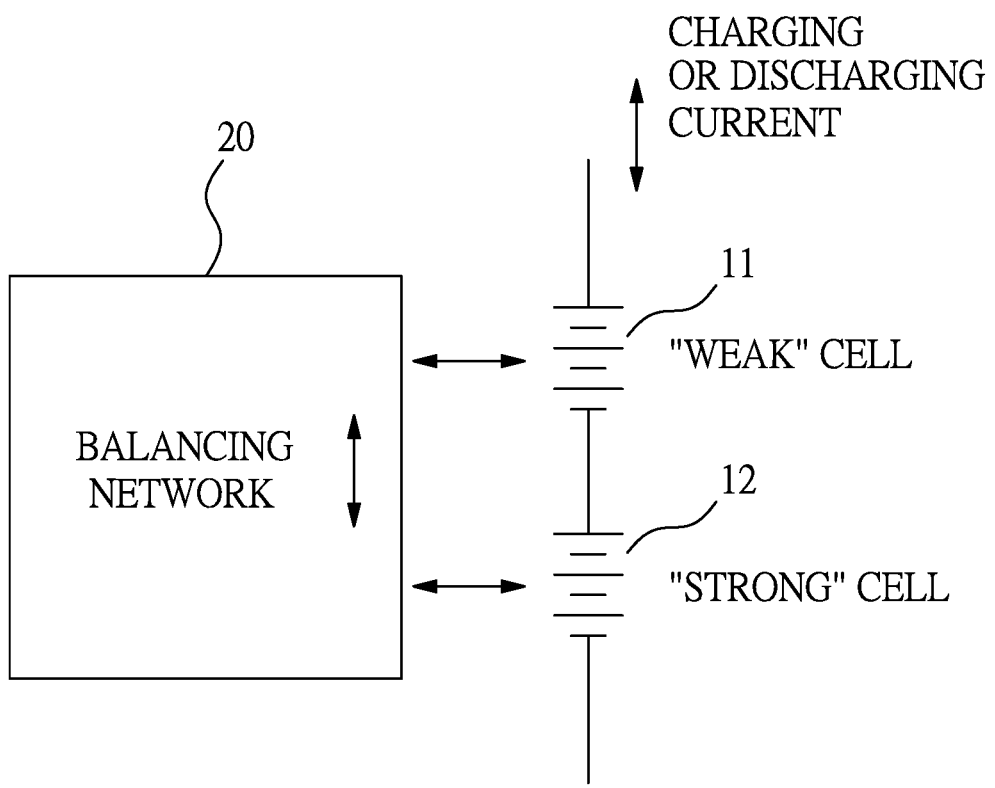
FIG. 2 is an illustrative diagram of a battery module using a charge balancing network of prior art.
Figure 3A:
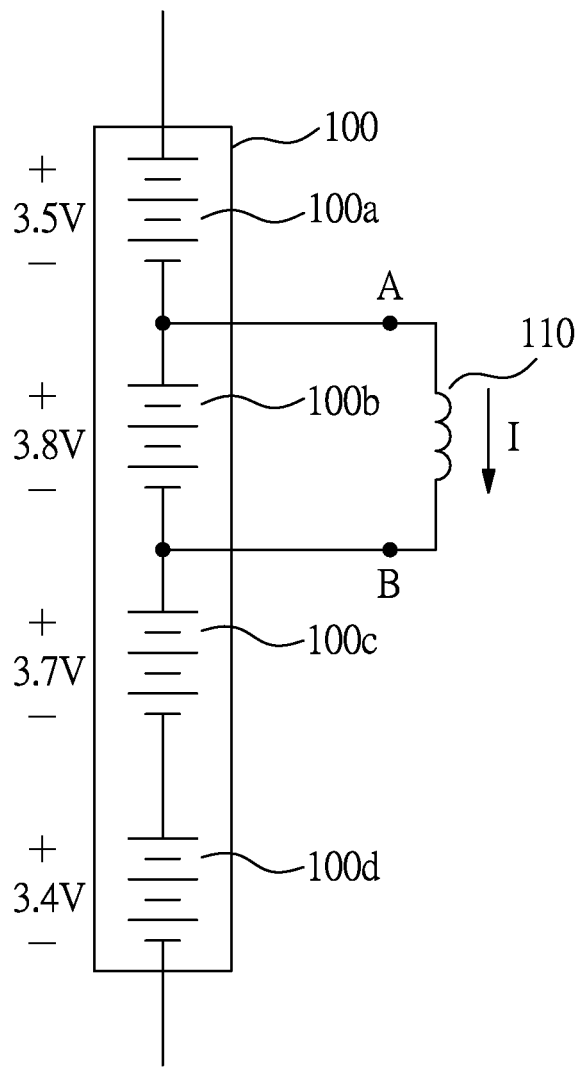
FIG. 3a and FIG. 3b are used for illustrating the principle of the present invention.
Figure 3B:
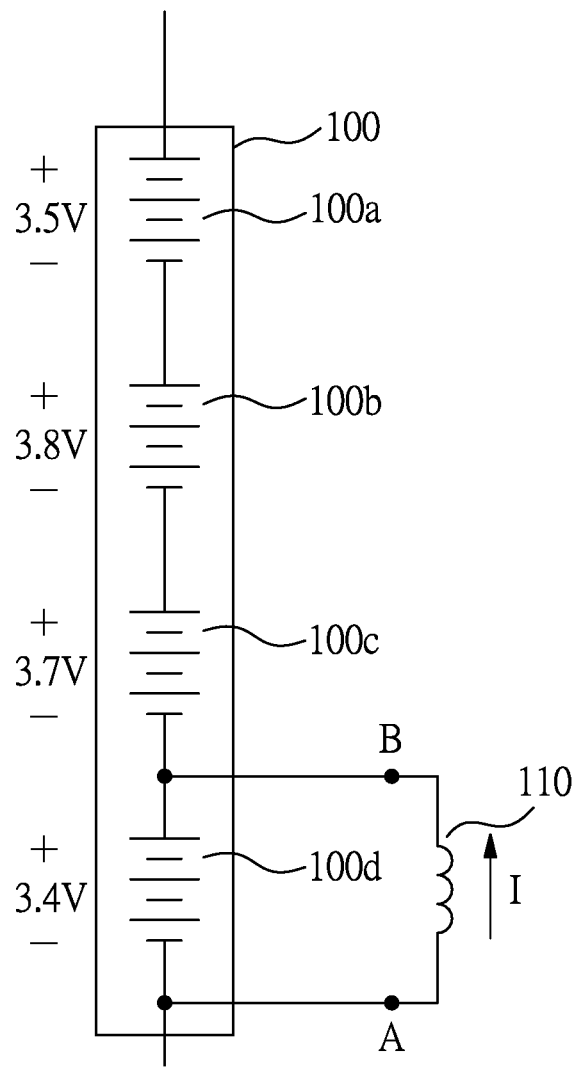

FIG. 3a and FIG. 3b are used for illustrating the principle of the present invention, where only 4 Li-ion cells are shown the scheme can handle an arbitrary number of cells. In production it is thought that 12 cells may be a useful number with which to start.

As illustrated in FIG. 3a, a battery string 100 has 4 cells (100a, 100b, 100c and 100d) in series and the cell 100b having a highest voltage of 3.8V is selected to charge an inductor 110 to store energy therein by connecting the positive terminal and the negative terminal of the cell 100b with a terminal A and a terminal B of an inductor 110 respectively, where the energy stored in the inductor 110 is proportional to a built up current I squared; and as illustrated in FIG. 3b, the cell 100d having a lowest voltage of 3.4V is selected to receive energy from the inductor 110 by connecting the positive terminal and the negative terminal of the cell 100d with the terminal B and the terminal A of the inductor 110 respectively. By repeating this process over and over again the cell voltages of all the cells in the battery string 100 will eventually converge to an average value.

Figure 4:
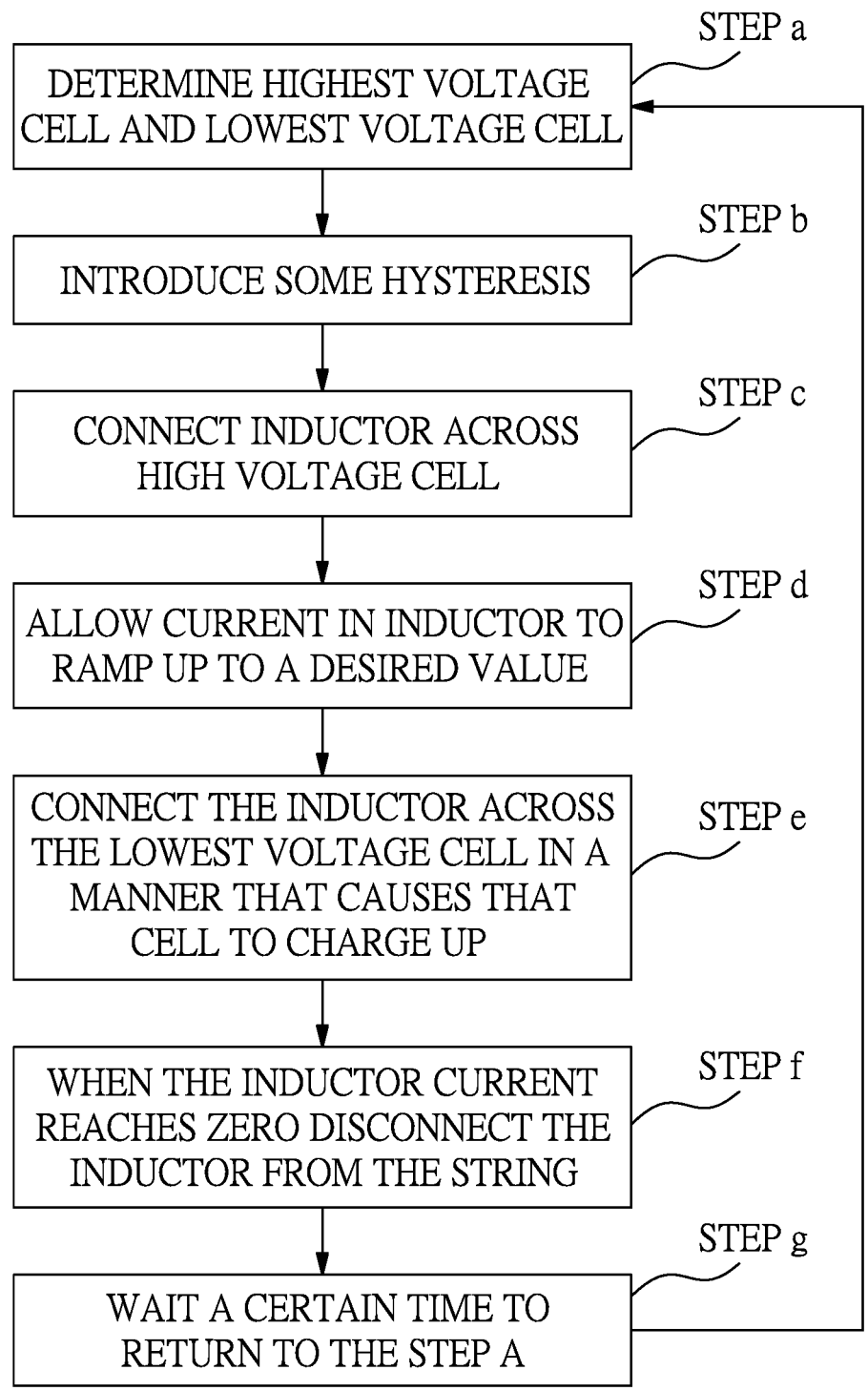
FIG. 4 illustrates a flow chart of an embodiment of the cell balancing method of the present invention.

Please refer to FIG. 4, which illustrates a flow chart of an embodiment of the cell balancing method of the present invention. As illustrated in FIG. 4, the cell balancing method includes the steps of: determine highest voltage cell and lowest voltage cell (step a); introduce some hysteresis (step b); connect inductor across high voltage cell (step c); allow current in inductor to ramp up to a desired value (step d); connect the inductor across the lowest voltage cell in a manner that causes that cell to charge up (step e); when the inductor current reaches zero disconnect the inductor from the string (step f); and wait a certain time to return to the step a (step g).

Figure 5:
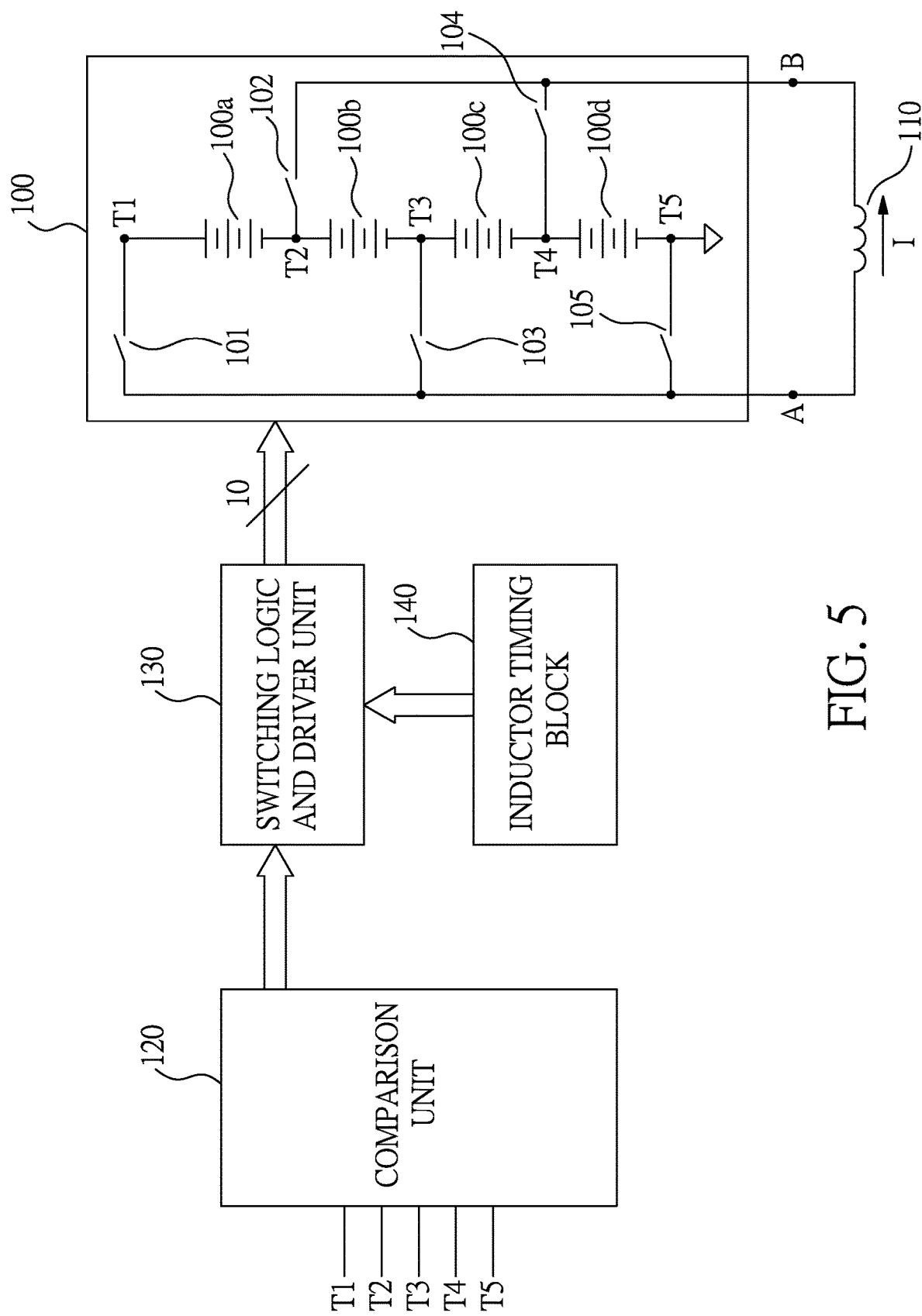
FIG. 5 illustrates a block diagram of an embodiment of a cell balancing battery module for realizing the cell balancing method of FIG. 4.

To implement the steps of the cell balancing method of FIG. 4, a comparison circuit and a switch logic circuit are needed. Please refer to FIG. 5, which illustrates a block diagram of an embodiment of a cell balancing battery module for realizing the cell balancing method of FIG. 4. As illustrated in FIG. 5, the cell balancing battery module includes a battery string 100, an inductor 110, a comparison unit 120, a switching logic and driver unit 130 and an inductor timing block 140.

The battery string 100 has 4 cells (100a, 100b, 100c and 100d) in series, 5 terminals (T1, T2, T3, T4 and T5), 3 first switches (101, 103 and 105) and 2 second switches (102 and 104), where the terminals T1, T3 and T5 are connected to the terminal A of the inductor 110 via the 3 first switches, and the terminals T2 and T4 are connected to the terminal B of the inductor 110 via the 2 second switches; the comparison unit 120 is configured to find the highest voltage cell and the lowest voltage cell of the battery string 100; the switching logic and driver unit 130 is used to configure a connection of the 3 first switches and the 2 second switches according to the output of the comparison unit 120 under the control of the inductor timing block 140; and the inductor timing block 140 is used to determine a charging time and a discharging time of the inductor 110.

Figure 6:
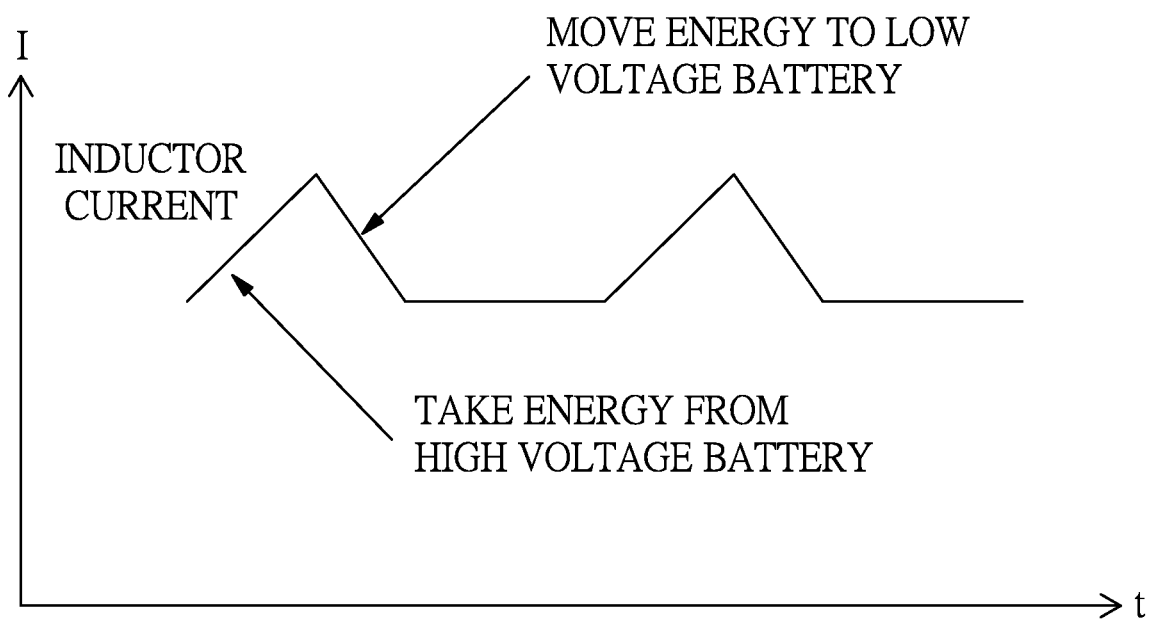
FIG. 6 illustrates a waveform of the current flowing through an inductor resulting from the operation of the cell balancing battery module of FIG. 5.
Figure 7A:
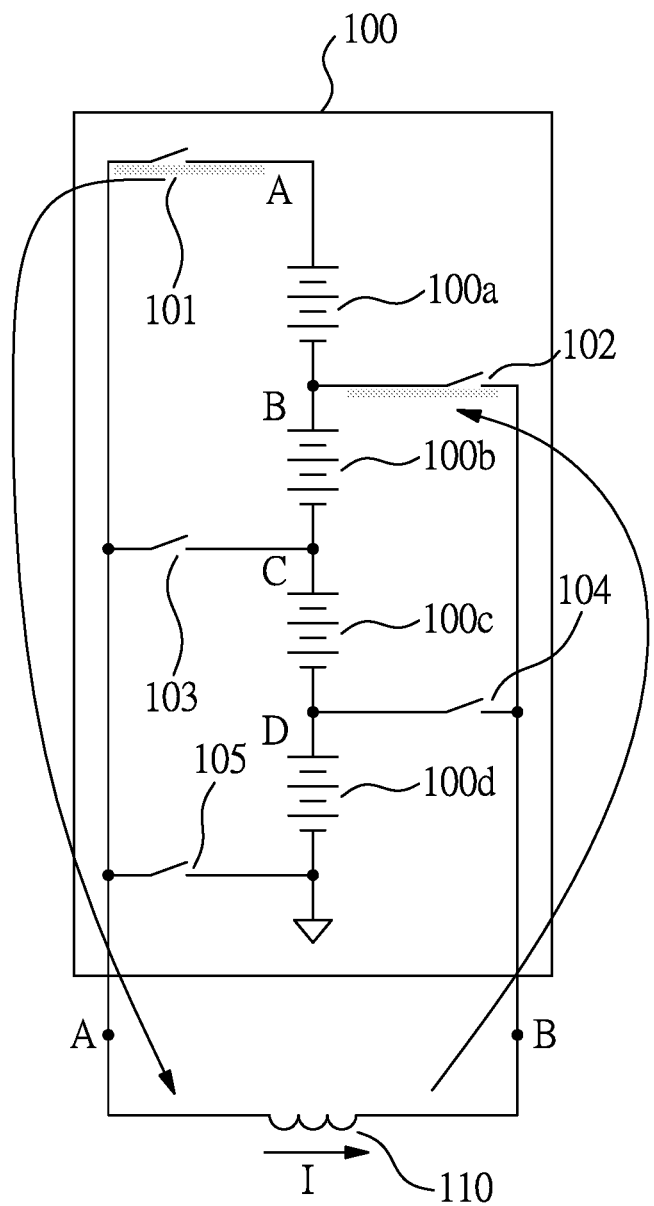
FIG. 7a illustrates the connection configuration of the 3 first switches and the 2 second switches formed in the phase I of FIG. 5.
Figure 7B:
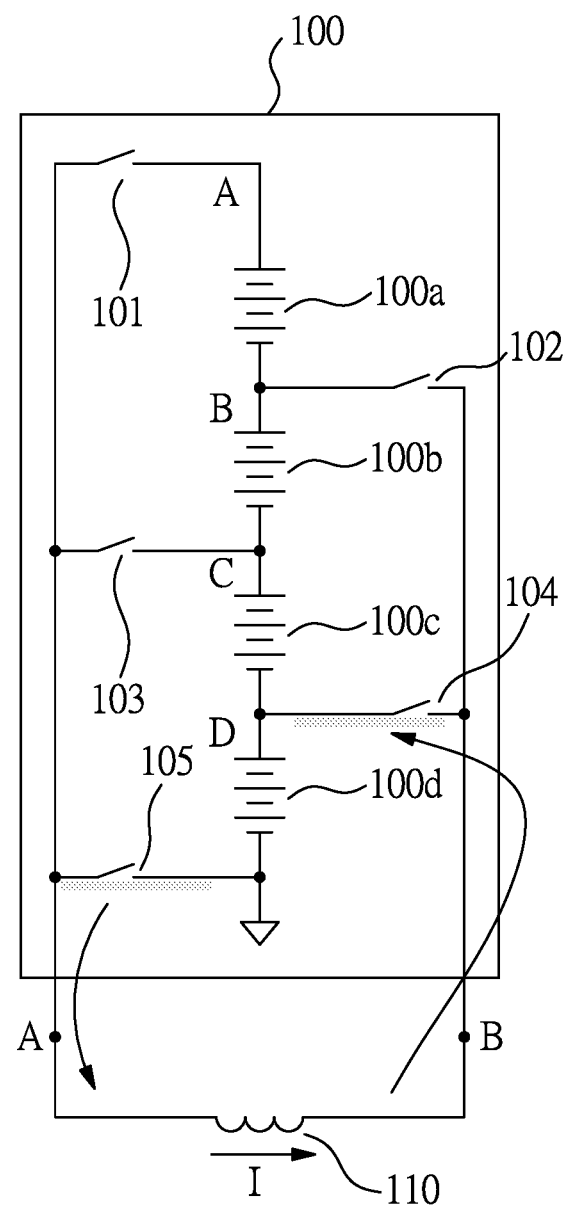
FIG. 7b illustrates the connection configuration of the 3 first switches and the 2 second switches formed in the phase II of FIG. 5.

Please refer to FIG. 6, which illustrates a waveform of the current flowing through the inductor 110 resulting from the operation of the cell balancing battery module of FIG. 5. As illustrated in FIG. 6, a phase I (a ramp-up phase) of the current I indicates that the inductor 110 takes energy from the highest voltage cell of the 4 cells (100a, 100b, 100c and 100d), and a phase II (a ramp-down phase) of the current I where the inductor 110 delivers energy to the lowest voltage cell of the 4 cells (100a, 100b, 100c and 100d). Assume the cell 100a is the highest voltage cell, and the cell 100d is the lowest voltage cell, and then the connection configuration of the 3 first switches and the 2 second switches formed in the phase I is illustrated in FIG. 7a, where the first switch 101 and the second switch 102 are switched on to enable the highest voltage cell 100a to deliver energy to the inductor 110; and the connection configuration of the 3 first switches and the 2 second switches formed in the phase II is illustrated in FIG. 7b, where the first switch 105 and the second switch 104 are switched on to enable the inductor 110 to deliver energy to the lowest voltage cell 100d. Except for the resistive loss in the switches and inductor the energy transfer is lossless.

Problem with the Ideal Case

Figure 7C:
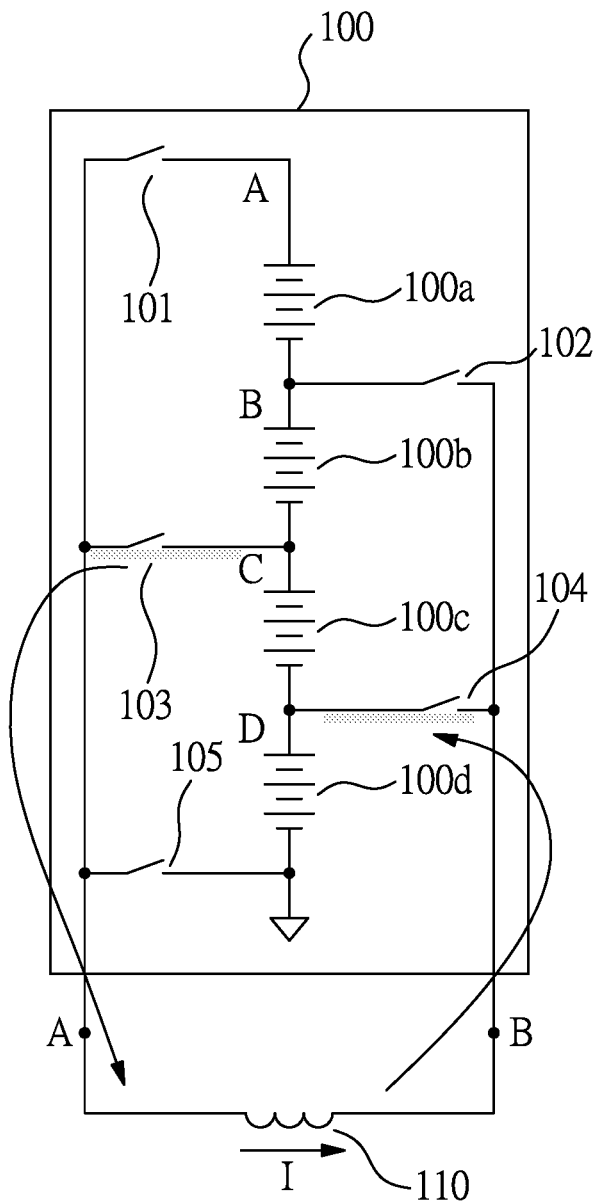
FIG. 7c illustrates a scenario where the inductor current discharges a cell already being the lowest voltage cell of all the cells.

If the cell 100a is the highest and the cell 100c is the lowest then the polarities across the inductor 110 is the opposite to what we wish. Please refer to FIG. 7c, in which the inductor current discharges the cell 100c, but the cell 100c is already the lowest voltage of all the cells. This is not desirable.

Solution

The present invention partitions the cells into odd and even cells. "Odd" and "even" are just names and could as easily be called "red" and "green". Energy can be taken from odd cells and moved to even cells, or energy can be moved from even cells into odd cells. However, we cannot move energy from odd cells into odd cells, or from even cells into even cells. As a result, the algorithm then becomes: finding a highest odd cell and transferring some energy fromit into a lowest even cell (step a1); then finding a highest even cell and transferring some energy from it into a lowest odd cell (step b1); and continuing the step a1 and b1 until all cell voltages are equal (step c1).

There is a special case that needs to be handled when the voltage of the lowest even cell is higher than the highest voltage of odd cells, or the voltage of the lowest odd cell is higher than the voltage of the highest voltage of the even cells.

Another way to say this is: when it is time to transfer from the highest odd cell into the lowest even cell, but odd cell is a lower voltage than the even cell we must stop this cycle or else we will suck energy out of a lower voltage cell and put it into a higher voltage cell. That will cause the battery voltages to diverge, the exact opposite of what we want to occur.

The reverse situation is: when it is time to transfer from the highest even cell into the lowest odd cell, but the odd cell is higher in voltage than the even cell we must stop this cycle or else we will again suck energy out of a lower voltage cell and put it into a higher voltage cell, which will cause the battery voltages to diverge.

Figure 8:
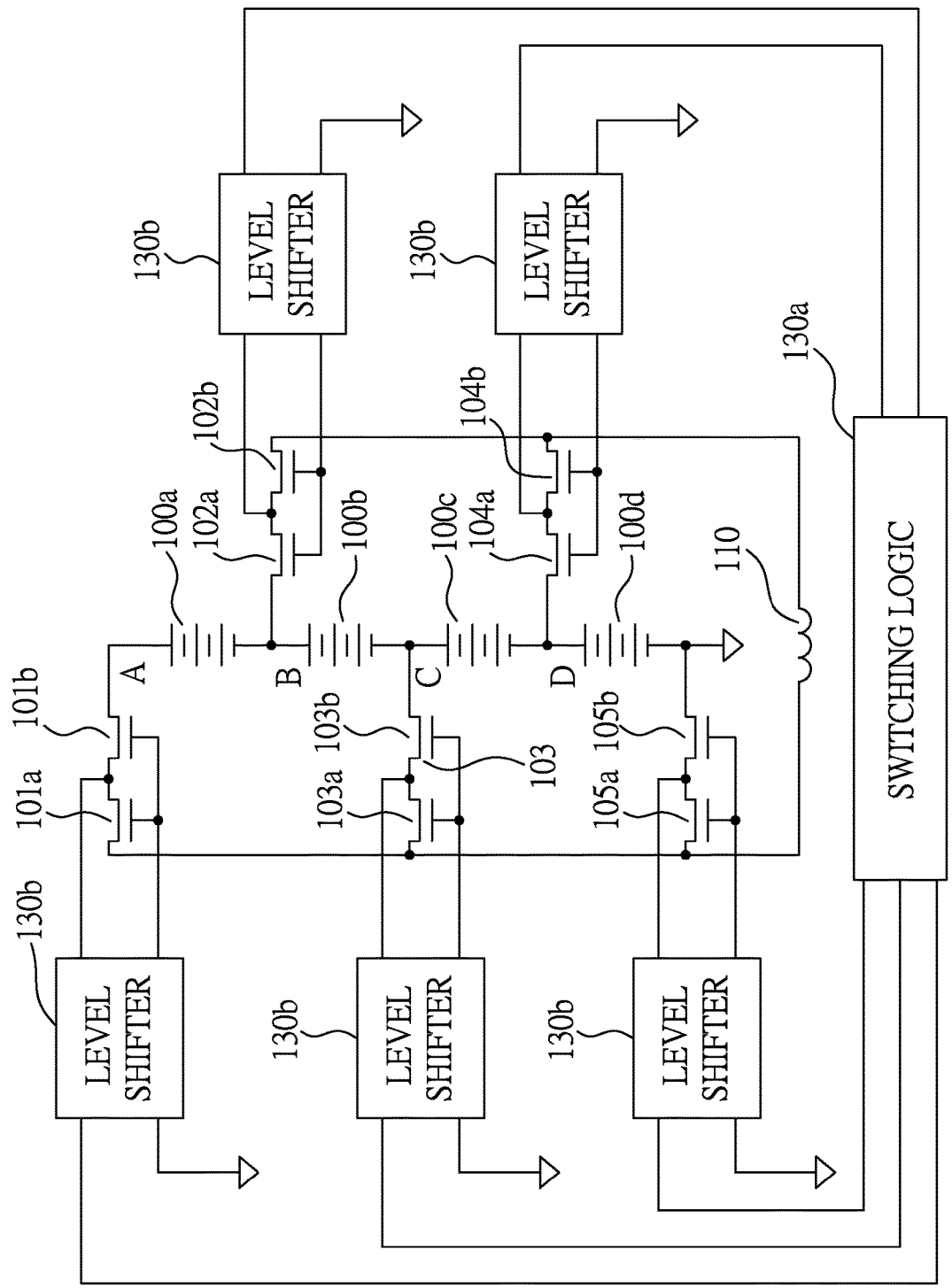
FIG. 8 illustrates a circuit diagram of an embodiment of the switching logic and driver unit and the first switches and the second switches of the cell balancing battery module of FIG. 5.

In addition, when implementing the first switches and the second switches, it is to be noted that, if each switch uses only a single MOSFET, as the MOSFET body diode thereof will provide a one-directional conducting path, a conducting path can still exist even when the single MOSFET is switched off by a switch signal. To solve this problem, back to back MOS devices can be used. Please refer to FIG. 8, which illustrates a circuit diagram of an embodiment of the switching logic and driver unit 130 and the first switches (101, 103 and 105) and the second switches (102 and 104) of the cell balancing battery module of FIG. 5. As illustrated in FIG. 8, the switching logic and driver unit 130 includes a switching logic 130a and 5 level shifters 130b, and each of the first switches (101, 103 and 105) and the second switches (102 and 104) is implemented by two back to back MOSFETs, that is, the first switch 101 is implemented by two back to back MOSFETs (101a, 101b), the first switch 103 is implemented by two back to back MOSFETs (103a, 103b), the first switch 105 is implemented by two back to back MOSFETs (105a, 105b), the second switch 102 is implemented by two back to back MOSFETs (102a, 102b), and the second switch 104 is implemented by two back to back MOSFETs (104a, 104b).

Figure 9B:
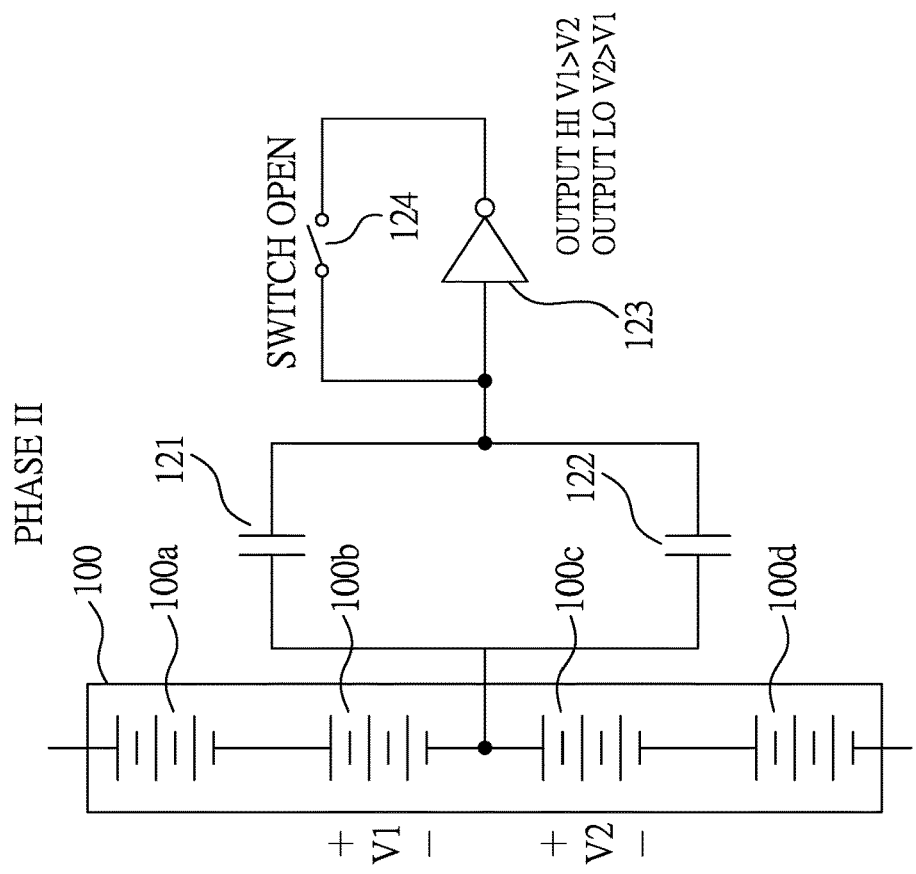
FIG. 9a and FIG. 9b illustrate two operational phases of a switched capacitor differential comparator adopted by the present invention for finding the higher of two cell voltages V1 and V2.
Figure 9A:
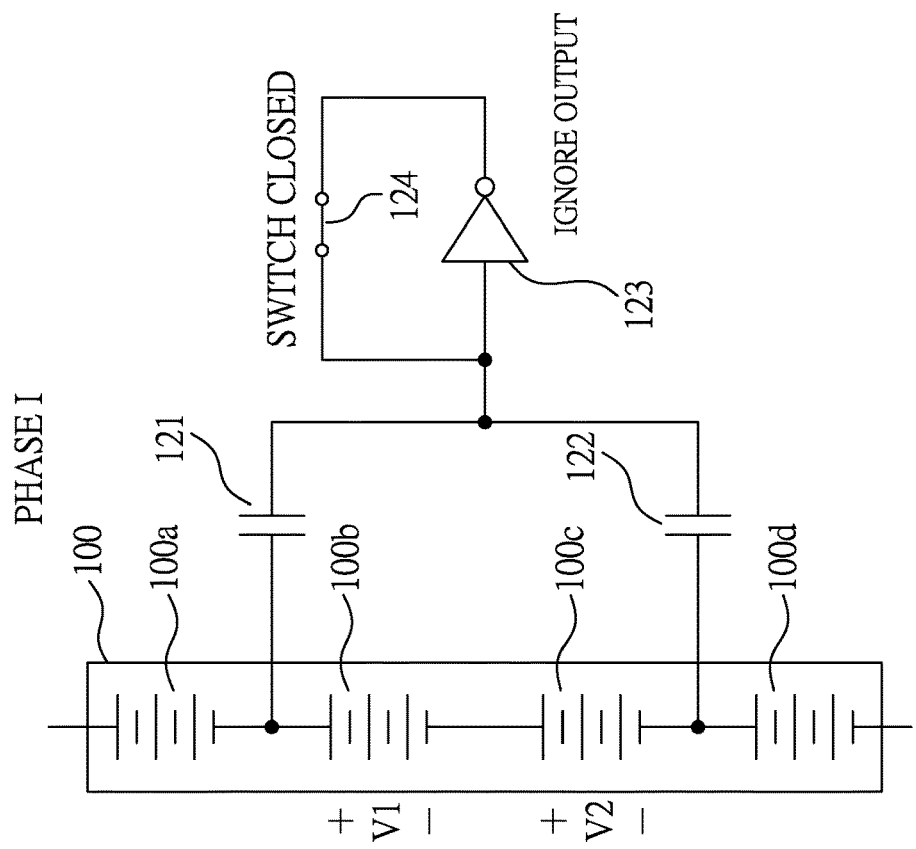

Highest/Lowest Comparison:

The comparison unit 120 for finding the highest voltage cell and the lowest voltage cell of the battery string 100 can be implemented in a number of ways. A switched capacitor differential comparator works well in this situation because it is naturally error correcting and because the battery voltage does not need to be known continuously, thus the comparator output can be clocked. Please refer to FIG. 9a and FIG. 9b, which illustrate two operational phases of a switched capacitor differential comparator for finding the higher of two cell voltages V1 and V2. The switched capacitor differential comparator includes a first capacitor 121, a second capacitor 122, an inverter 123 and a switch 124. When in phase I, as illustrated in FIG. 9a, the first capacitor 121 has a first end connected to the positive terminal of the cell voltage V1, and a second end connected to an input end of the inverter 123, the second capacitor 122 has a third end connected to the negative terminal of the cell voltage V2, and a fourth end connected to the input end of the inverter 123, and the switch 124 is switched on to short the input end and an output end of the inverter 123; and when in phase II, as illustrated in FIG. 9b, the first capacitor 121 has the first end connected to the negative terminal of the cell voltage V1, and the second end connected with the input end of the inverter 123, the second capacitor 122 has the third end connected to the positive terminal of the cell voltage V2, and the fourth end connected with the input end of the inverter 123, and the switch 124 is switched off to enable the inverter 123 to provide an output voltage Vo via the output end, where the output voltage Vo will be at a high level if V1>V2, and will be at a low level if V1<V2.

In an alternative embodiment of the switched capacitor differential comparator, when in phase I, the first capacitor 121 has the first end connected to the negative terminal of the first cell voltage V1, and the second end connected to the input end of the inverter 123, the second capacitor 122 has the third end connected to the positive terminal of the second cell voltage V2, and the fourth end connected to the input end of the inverter 123, and the switch 124 is switched on to short the input end and the output end of the inverter 123; and when in phase II, the first capacitor 121 has the first end connected to the positive terminal of the first cell voltage V1, and the second end connected with the input end of the inverter 123, the second capacitor 122 has the third end connected to the negative terminal of the second cell voltage V2, and the fourth end connected with the input end of the inverter 123, and the switch 124 is switched off to enable the inverter 123 to provide an output voltage via the output end, where the output voltage will be at a low level if the first cell voltage V1 is higher than the second cell voltage V2, and will be at a high level if the first cell V1 voltage is lower than the second cell voltage V2.

The algorithm starts when two cells are compared with each other. If we are checking for the highest voltage then the higher of the two cells is remembered and then compared to the next cell in the string, the higher of the second comparison is remembered and is then compared to the next cell in the string and so on and so forth.

In the same way the lowest voltage can also be found. Two cells are compared to each other, then the lower is compared to the next cell, then the lower of that comparison is compared to the next cell and so on and so forth.

It is advantageous to add some hysteresis into the highest/lowest comparison so that the cells exchanging energy do not shuttle energy back and forth from one clock cycle to the next. Once a highest voltage cell has been found the hysteresis will tend to keep it the highest for a slightly longer time. In the same way, once the lowest voltage cell is found the hysteresis will tend to keep it as the lowest voltage cell for a slightly longer time than without hysteresis.

The hysteresis could be introduced by adding an offset to the gain stage in phase II shown in FIG. 9b. There are many ways to introduce hysteresis into a comparison, but these are mostly prior art and not significant to the description of this invention.

Figure 10B:
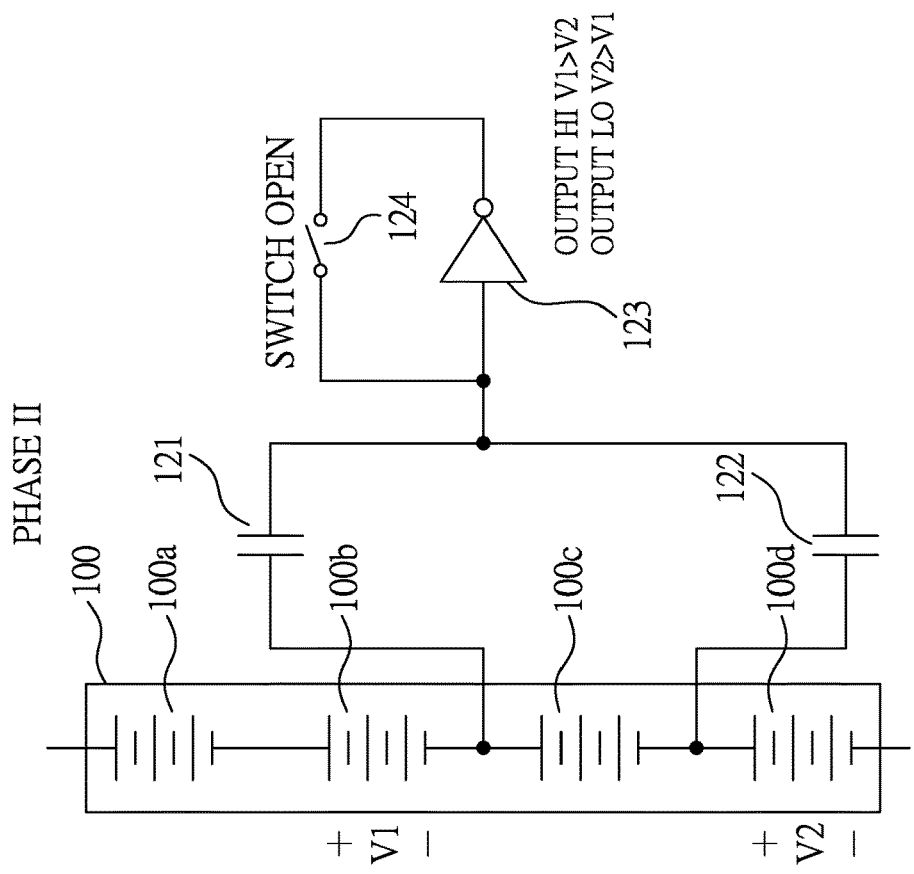
FIG. 10a and FIG. 10b illustrate two operational phases of a switched capacitor differential comparator adopted by the present invention for finding the higher of two non-adjacent cells.
Figure 10A:
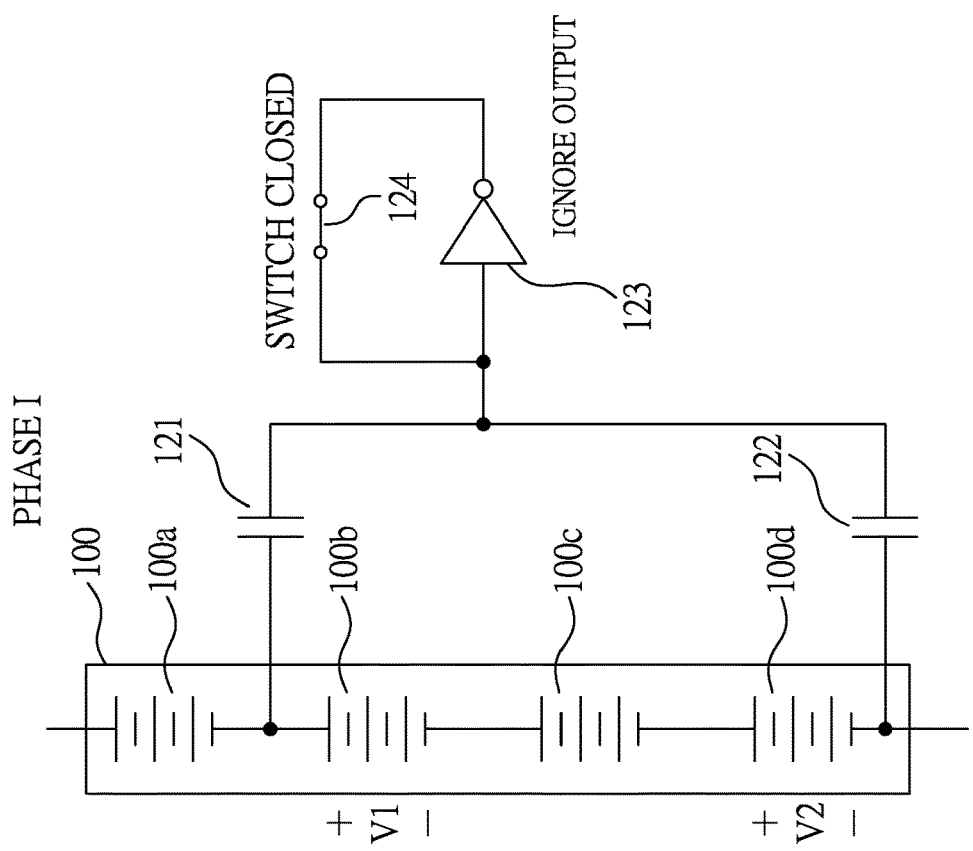

Please note that the cells that are compared do not have to be adjacent to each other. The basic strategy will work with non-adjacent cells, as shown in FIG. 10a and FIG. 10b.

Figure 11:
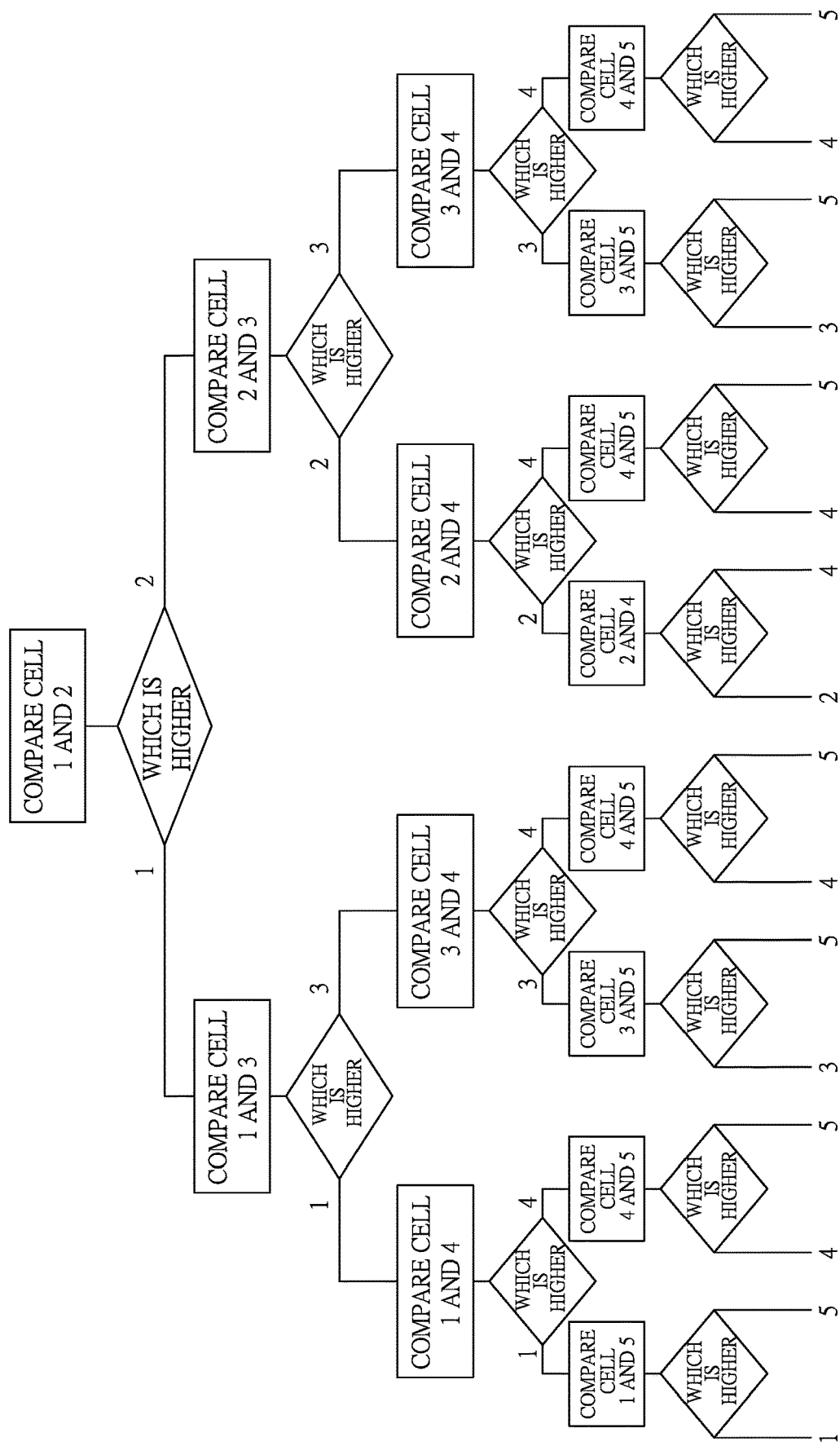
FIG. 11 illustrates a decision tree adopted by the present invention for finding the highest battery voltage.

There are various algorithms for finding the highest/lowest battery voltage, for example, a decision tree algorithm. Please refer to FIG. 11, which illustrates a decision tree for finding the highest battery voltage. As shown in FIG. 11, the highest voltage is evident at the bottom of the tree. The algorithm can be extended to any number of cells and it works for both maximum voltage and minimum voltage. In fact the maximum and minimum trees can be interleaved.

The highest/lowest determination can go on continuously or can be clocked at a certain rate if energy consumption is critical.

Based on the design principles elaborated above, the cell balancing battery module of the present invention can be summarized as including: a cell string having N cells in series to provide N+1 terminals, each of the N cells having a port consisting of a positive end and a negative end connected with two adjacent terminals of the N+1 terminals respectively; a comparison unit coupled with the N+1 terminals for performing a voltage comparison procedure to find a highest voltage port number and a lowest voltage port number out of N said ports, the voltage comparison procedure including a plurality of voltage comparison operations using at least one comparison circuit; a switching logic and driver unit coupled with the cell string and an inductor, and being configured to select a highest voltage port out of N said ports according to the highest voltage port number to deliver energy to the inductor, and select a lowest voltage port out of N said ports according to the lowest voltage port number to receive energy released from the inductor.

In the description above, the term "port" refers to, according to the definition of electrical circuit theorem, a pair of terminals connecting an electrical network or circuit to an external circuit, as a point of entry or exit for electrical energy.

In addition, the voltage comparison procedure further includes: finding a highest odd cell and transferring an amount of energy from the highest odd cell into a lowest even cell; finding a highest even cell and transferring an amount of energy from the highest even cell into a lowest odd cell; and repeating the two steps above until all cell voltages are equal.

To verify the performance of the cell balancing battery module of the present invention, a CAD tool, Verilog-A, is used to simulate the operations of the cell balancing battery module of the present invention. For these simulations the batteries are approximated by very large capacitors.

Figure 12A:
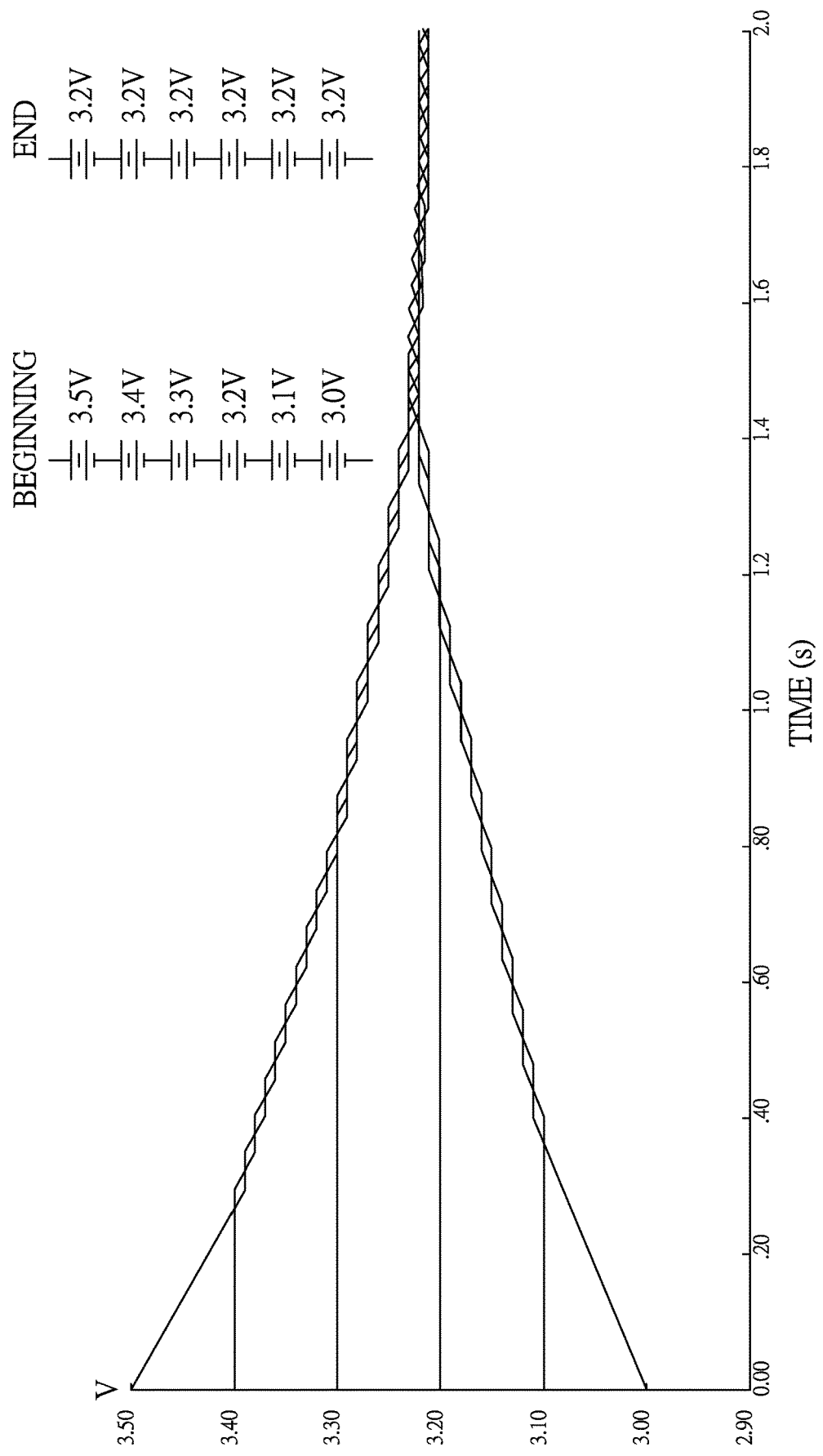
FIG. 12a illustrates a converging behavior of 6 cell voltages for a first simulation of the present invention.

Please refer to FIG. 12a, which illustrates a converging behavior of 6 cell voltages for a first simulation, and the cell starting voltages are (starting from the top): 3.5 v, 3.4 v, 3.3 v, 3.2 v, 3.1 v, 3 v. As can be seen in FIG. 12a, at the end of the simulation the cell voltages have all equalized to 3.2 v. Note that there is a small variation in the final cell voltages, this is due to the comparator hysteresis mentioned earlier, and it can be made arbitrarily smaller or larger.

Figure 12B:
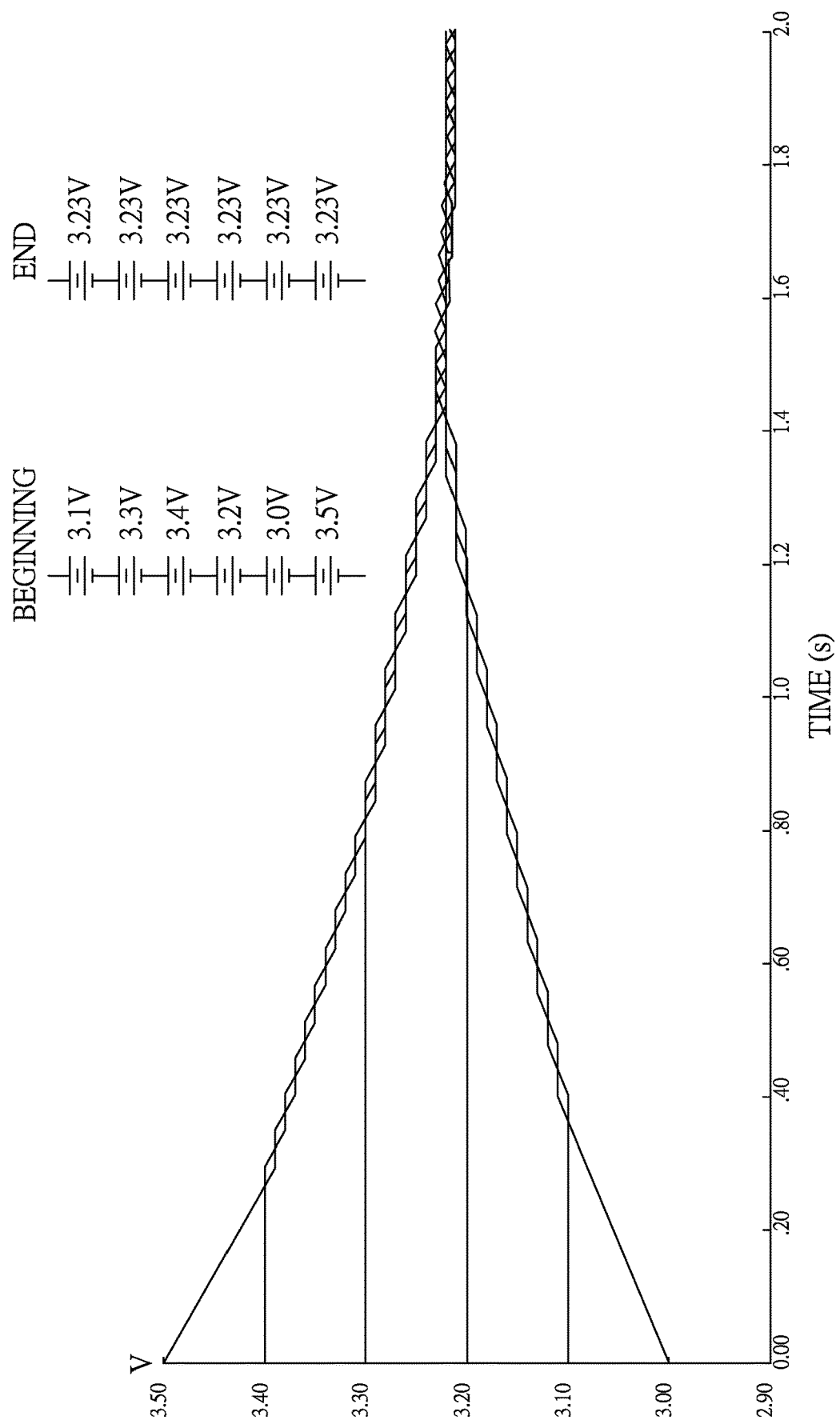
FIG. 12b illustrates a converging behavior of 6 cell voltages for a second simulation of the present invention.

Please refer to FIG. 12b, which illustrates a converging behavior of 6 cell voltages for a second simulation, and the cell starting voltages are (starting from the top): 3.1 v, 3.3 v, 3.4 v, 3.2 v, 3.0 v, 3.5 v. As can be seen in FIG. 12b, at the end of the simulation the cell voltages have all equalized to 3.2 v (just as they had in the previous simulation with different starting voltages). Note that there is a small variation in the final cell voltages, this is due to the comparator hysteresis mentioned earlier, and it can be made arbitrarily smaller or larger.

Figure 13:
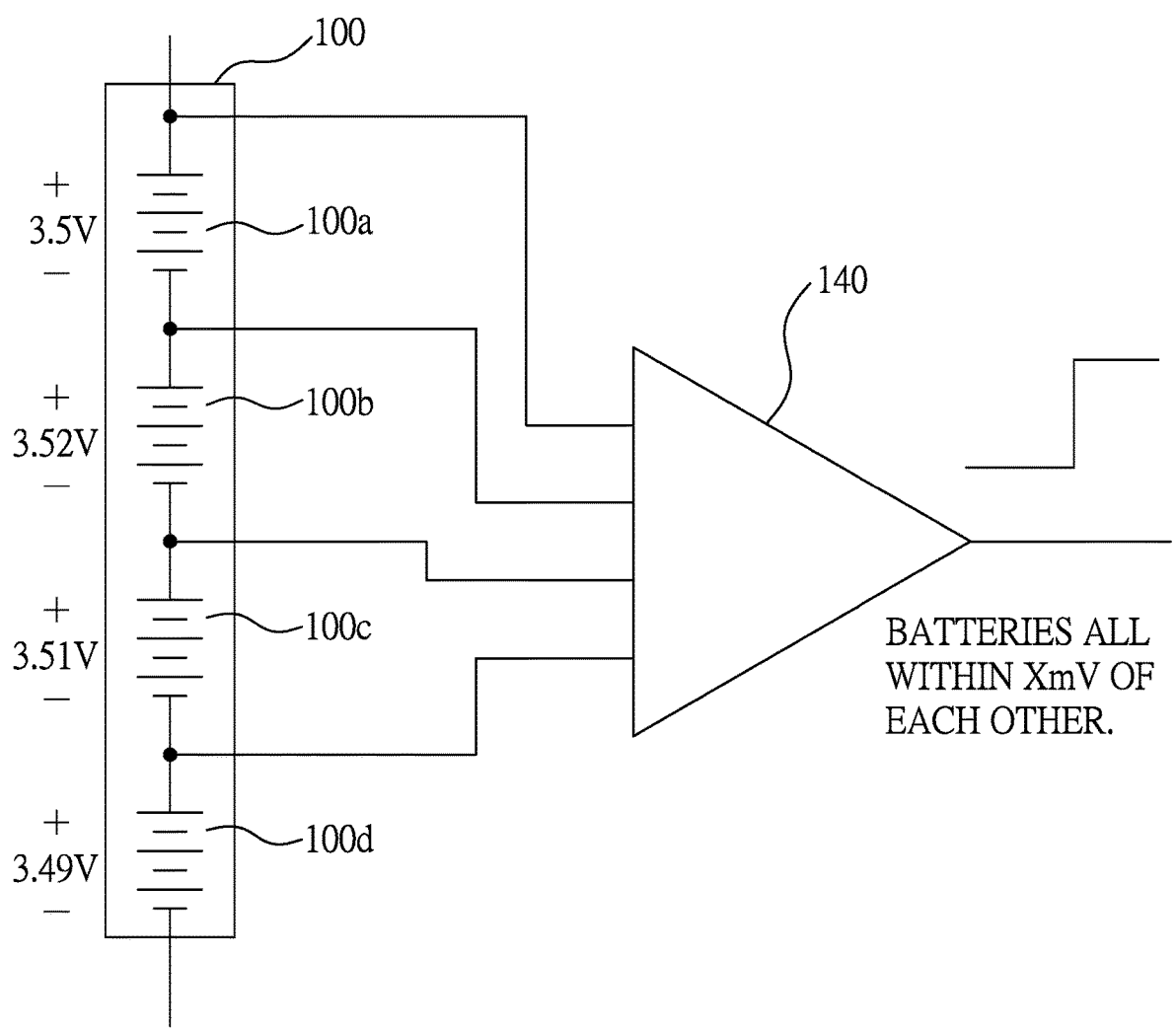
FIG. 13 illustrates a detection circuit adopted by the present invention for detecting if cells are all within a preset voltage of each other.

In addition to the comparison unit 120 that determines the highest and lowest voltage, we also need a circuit that tells us when each cell is near enough in voltage to the other cells so that we can call the battery string "balanced". Please refer to FIG. 13, which illustrates a detection circuit 140 for detecting if cells are all within XmV of each other. The detection circuit 140 will output a high level when the cells are all within XmV (35 mV for example) of each other. This will stop the inductor from just passing energy back and forth between batteries without really accomplishing anything except dissipating power in the switching circuit's parasitic resistances.

It may also be desirable to allow the user to interrupt the balancing procedure whenever they desire. For instance, if this was an automotive application there may be different battery loading conditions (perhaps extreme acceleration) where the user may want to temporarily stop the battery balancing procedure.

Figure 14:
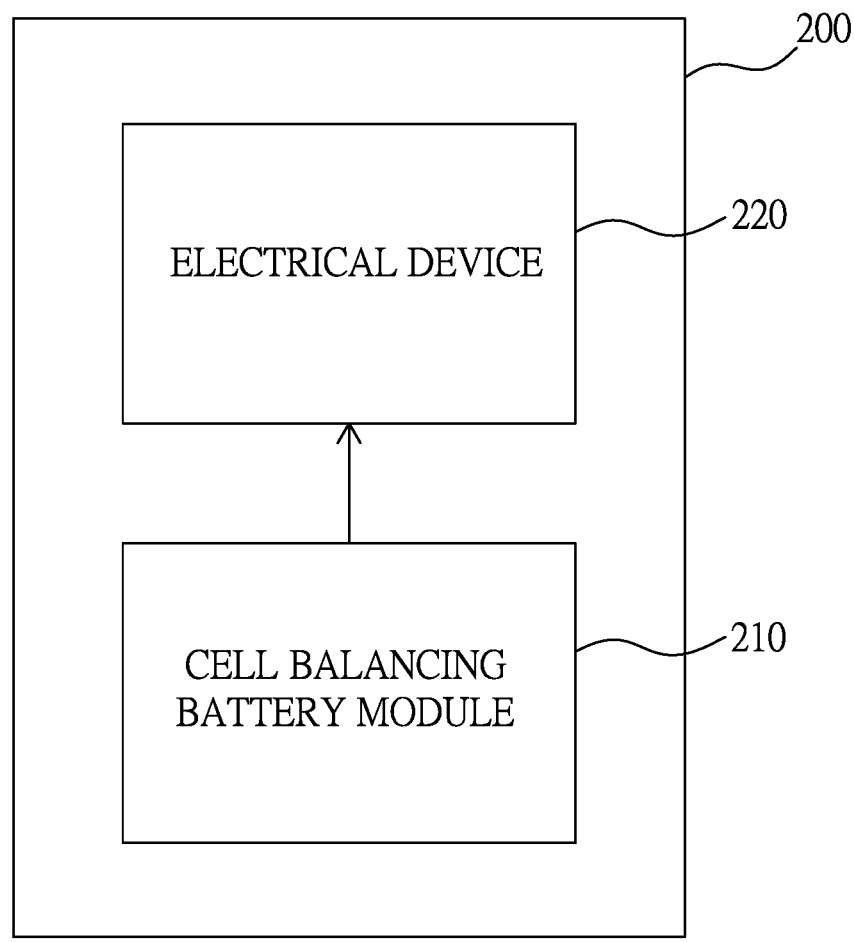
FIG. 14 illustrates a block diagram of an electrical apparatus according an embodiment of the present invention.

In light of the designs mentioned above, the present invention further proposes an electrical apparatus. Please refer to FIG. 14, which illustrates a block diagram of an electrical apparatus according an embodiment of the present invention. As illustrated in FIG. 14, an electrical apparatus 200, which can be an electrical vehicle or a portable computer, or other, includes a cell balancing battery module 210 and an electrical device 220 powered by the cell balancing battery module 210, where the cell balancing battery module 210 is implemented by the cell balancing battery module shown in FIG. 5.

Thanks to the designs disclosed above, the present invention can therefore provide the advantages as follows:

1. The cell balancing battery module of the present invention can balance the energy among a string of cells by adopting a battery charge balancing scheme that is simple, robust, efficient and inexpensive.

2. The cell balancing battery module of the present invention can maximize the energy that a battery string is capable of providing and also increase the lifetime of the battery string.

3. The electrical apparatus using the cell balancing battery module of the present invention can balance the energy among a string of cells by adopting a battery charge balancing scheme that is simple, robust, efficient and inexpensive.

4. The electrical apparatus using the cell balancing battery module of the present invention can maximize the energy that a battery string is capable of providing and also increase the lifetime of the battery string.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A cell balancing battery module comprising:
a cell string having N cells in series to provide N+1 terminals, N>1, each of the N cells having a port consisting of a positive end and a negative end connected with two adjacent terminals of the N+1 terminals respectively;
a comparison unit coupled with the N+1 terminals for performing a voltage comparison procedure to find a highest voltage port number and a lowest voltage port number out of N said ports, the voltage comparison procedure including a plurality of voltage comparison operations using at least one comparison circuit; and
a switching logic and driver unit coupled with the cell string and an inductor, and being configured to select a highest voltage port out of N said ports according to the highest voltage port number to deliver energy to the inductor, and select a lowest voltage port out of N said ports according to the lowest voltage port number to receive energy released from the inductor;

wherein the voltage comparison procedure further includes:

finding a highest odd cell and transferring an amount of energy from the highest odd cell into a lowest even cell;

finding a highest even cell and transferring an amount of energy from the highest even cell into a lowest odd cell; and repeating the two steps above until all cell voltages are equal.

2. The cell balancing battery module of claim 1, wherein the voltage comparison procedure includes a decision tree algorithm.

3. The cell balancing battery module of claim 1, wherein the comparison circuit is a switched capacitor comparison circuit including a first capacitor, a second capacitor, an inverter and a switch, when in phase I, the first capacitor has a first end connected to the positive terminal of a first cell voltage, and a second end connected to an input end of the inverter, the second capacitor has a third end connected to the negative terminal of a second cell voltage, and a fourth end connected to the input end of the inverter, and the switch is switched on to short the input end and an output end of the inverter; and when in phase II, the first capacitor has the first end connected to the negative terminal of the first cell voltage, and the second end connected with the input end of the inverter, the second capacitor has the third end connected to the positive terminal of the second cell voltage, and the fourth end connected with the input end of the inverter, and the switch is switched off to enable the inverter to provide an output voltage via the output end, where the output voltage will be at a high level if the first cell voltage is higher than the second cell voltage, and will be at a low level if the first cell voltage is lower than the second cell voltage.

4. The cell balancing battery module of claim 1, wherein the comparison circuit is a switched capacitor comparison circuit including a first capacitor, a second capacitor, an inverter and a switch, when in phase I, the first capacitor has a first end connected to the negative terminal of a first cell voltage, and a second end connected to an input end of the inverter, the second capacitor has a third end connected to the positive terminal of a second cell voltage, and a fourth end connected to the input end of the inverter, and the switch is switched on to short the input end and an output end of the inverter; and when in phase II, the first capacitor has the first end connected to the positive terminal of the first cell voltage, and the second end connected with the input end of the inverter, the second capacitor has the third end connected to the negative terminal of the second cell voltage, and the fourth end connected with the input end of the inverter, and the switch is switched off to enable the inverter to provide an output voltage via the output end, where the output voltage will be at a low level if the first cell voltage is higher than the second cell voltage, and will be at a high level if the first cell voltage is lower than the second cell voltage.

5. The cell balancing battery module of claim 1, further comprising a detection circuit for detecting if cells of the cell string are all within a preset voltage of each other, and the detection circuit will output a high level when the cells are all within the preset voltage of each other.

6. The cell balancing battery module of claim 1, wherein the voltage comparison operations have included a hysteresis voltage.

7. An electrical apparatus including a cell balancing battery module and an electrical device powered by the cell balancing battery module, the cell balancing battery module comprising:

a cell string having N cells in series to provide N+1 terminals, N>1, each of the N cells having a port consisting of a positive end and a negative end connected with two adjacent terminals of the N+1 terminals respectively;

a comparison unit coupled with the N+1 terminals for performing a voltage comparison procedure to find a highest voltage port number and a lowest voltage port number out of the N said ports, the voltage comparison procedure including a plurality of voltage comparison operations using at least one comparison circuit; and a switching logic and driver unit coupled with the cell string and an inductor, and being configured to select a highest voltage port out of N said ports according to the highest voltage port number to deliver energy to the inductor, and select a lowest voltage port out of N said ports according to the lowest voltage port number to receive energy released from the inductor;

wherein the voltage comparison procedure further includes:

finding a highest odd cell and transferring an amount of energy from the highest odd cell into a lowest even cell;

finding a highest even cell and transferring an amount of energy from the highest even cell into a lowest odd cell; and repeating the two steps above until all cell voltages are equal.

8. The electrical apparatus of claim 7, wherein the voltage comparison procedure includes a decision tree algorithm.

9. The electrical apparatus of claim 7, wherein the comparison circuit is a switched capacitor comparison circuit including a first capacitor, a second capacitor, an inverter and a switch, when in phase I, the first capacitor has a first end connected to the positive terminal of a first cell voltage, and a second end connected to an input end of the inverter, the second capacitor has a third end connected to the negative terminal of a second cell voltage, and a fourth end connected to the input end of the inverter, and the switch is switched on to short the input end and an output end of the inverter; and when in phase II, the first capacitor has the first end connected to the negative terminal of the first cell voltage, and the second end connected with the input end of the inverter, the second capacitor has the third end connected to the positive terminal of the second cell voltage, and the fourth end connected with the input end of the inverter, and the switch is switched off to enable the inverter to provide an output voltage via the output end, where the output voltage will be at a high level if the first cell voltage is higher than the second cell voltage, and will be at a low level if the first cell voltage is lower than the second cell voltage.

10. The electrical apparatus of claim 7, wherein the comparison circuit is a switched capacitor comparison circuit including a first capacitor, a second capacitor, an inverter and a switch, when in phase I, the first capacitor has a first end connected to the negative terminal of a first cell voltage, and a second end connected to an input end of the inverter, the second capacitor has a third end connected to the positive terminal of a second cell voltage, and a fourth end connected to the input end of the inverter, and the switch is switched on to short the input end and an output end of the inverter; and when in phase II, the first capacitor has the first end connected to the positive terminal of the first cell voltage, and the second end connected with the input end of the inverter, the second capacitor has the third end connected to the negative terminal of the second cell voltage, and the fourth end connected with the input end of the inverter, and the switch is switched off to enable the inverter to provide an output voltage via the output end, where the output voltage will be at a low level if the first cell voltage is higher than the second cell voltage, and will be at a high level if the first cell voltage is lower than the second cell voltage.

11. The electrical apparatus of claim 7, wherein the cell balancing battery module further comprises a detection circuit for detecting if cells of the cell string are all within a preset voltage of each other, and the detection circuit will output a high level when the cells are all within the preset voltage of each other.

12. The electrical apparatus of claim 7, wherein the voltage comparison operations have included a hysteresis voltage.

13. The electrical apparatus of claim 7 being an electrical vehicle or a portable computer.

* * * * *